United States Patent
Bartell et al.

(10) Patent No.: US 6,907,146 B2
(45) Date of Patent: Jun. 14, 2005

(54) METHODS, SYSTEMS AND COMPUTER SOFTWARE FOR DETECTING PIXEL STUTTER

(75) Inventors: Daniel M. Bartell, San Carlos, CA (US); Richard Watts, San Mateo, CA (US)

(73) Assignee: Affymetrix, Inc., Santa Clara, CA (US)

( * ) Notice: Subject to any disclaimer, the term of this patent is extended or adjusted under 35 U.S.C. 154(b) by 540 days.

(21) Appl. No.: 09/734,751

(22) Filed: Dec. 11, 2000

(65) Prior Publication Data

US 2002/0106126 A1 Aug. 8, 2002

(51) Int. Cl.[7] .............................................. G06K 7/00
(52) U.S. Cl. ..................... 382/312; 382/194; 345/698
(58) Field of Search .......................... 382/312, 317, 382/318, 321, 323, 128, 168, 169, 173, 175, 181, 189, 194, 221, 237, 274, 305, 129, 130, 131, 132, 133, 286, 254, 172, 252, 275; 345/698, 699; 358/3.03, 1.9; 348/157, 608; 250/458.1; 347/258; 435/6

(56) References Cited

U.S. PATENT DOCUMENTS

| | | | | |
|---|---|---|---|---|
| 4,922,915 A | * | 5/1990 | Arnold et al. | 382/128 |
| 5,350,374 A | * | 9/1994 | Smith | 606/5 |
| 5,360,006 A | * | 11/1994 | Geiser et al. | 600/425 |
| 5,744,305 A | * | 4/1998 | Fodor et al. | 435/6 |
| 5,781,225 A | * | 7/1998 | Syracuse et al. | 347/258 |
| 5,945,679 A | * | 8/1999 | Dorsel et al. | 250/458.1 |
| 6,084,991 A | * | 7/2000 | Sampas | 382/312 |
| 6,542,183 B1 | * | 4/2003 | DeAngelis et al. | 348/157 |

* cited by examiner

*Primary Examiner*—Bhavesh M. Mehta
*Assistant Examiner*—Seyed Azarian
(74) *Attorney, Agent, or Firm*—Wei Zhou; Philip L. McGarrigle (57) ABSTRACT

Embodiments of the invention provide methods, computer software products and systems for detecting pixel stutter of a scanner. In one embodiment, a numeric count of stuttered pixels in both the x (row) and y (column) directions and a graphic display of the stuttered pixels overlaid on the image data are provided by the invention. The y-direction stutter count provides the estimate of pixel stutter from pure statistical data variations.

5 Claims, 5 Drawing Sheets

METHODS, SYSTEMS AND COMPUTER SOFTWARE FOR DETECTING PIXEL STUTTER

COPYRIGHT NOTICE

A portion of the disclosure of this patent document contains material that is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

APPENDIX

Appendix A is included herewith and forms a part of the disclosure.

BACKGROUND OF THE INVENTION

The present invention relates to the field of imaging. In particular, the present invention provides methods and apparatus for detecting pixel stutter and for improving scanner hardware and software design and scanner manufacturing quality control.

U.S. Pat. No. 5,424,186 describes a pioneering technique for, among other things, forming and using high density arrays of molecules such as oligonucleotide, RNA, peptides, polysaccharides, and other materials. This patent is hereby incorporated by reference for all purposes. In this preferred technique, arrays of oligonucleotides or peptides, for example, are formed on the surface by sequentially removing a photoremovable group from a surface, coupling a monomer to the exposed region of the surface, and repeating the process. These techniques have been used to form extremely dense arrays of oligonucleotides, peptides, and other materials. Such arrays are useful in, for example, drug development, gene expression monitoring, genotyping, and a variety of other applications.

Genetic mutations or gene expression may be detected by specific nucleic acid hybridization. A solution containing one or more targets to be analyzed (i.e., samples from patients) contacts the probe array. The targets will bind or hybridize with complementary probe sequences. Generally, the targets are labeled with a fluorescent marker, radioactive isotopes, enzymes, or other types of markers. Accordingly, locations at which targets hybridize with complimentary probes can be identified by locating the markers. Based on the locations where hybridization occur, information regarding the target sequences can be extracted. The existence of a mutation may be determined by comparing the target sequence with the wild type.

A number of scanning systems, such as the GeneArray® scanner (Affymetrix and Agilent, Calif.) and 428™ scanners (Affymetrix, Calif.), are available for obtaining hybridization images. However, there is still need in the art for methods, software and systems that evaluate the performance of scanning systems.

SUMMARY OF THE INVENTION

In one aspect of the invention, computer implemented methods are provided to detect pixel stutter. "Pixel stutter" is two or more adjacent pixels with the same intensity value because of scanning or other artifact(s).

In an exemplary embodiment, a numeric count of stuttered pixels in both the x (row) and y (column) directions and a graphic display of the stuttered pixels overlaid on the image data are provided by the invention. One of skill in the art would appreciate that the designation of rows vs. columns and x vs. y direction are for the convenience of describing embodiments of the invention. In general, the designation of row or x direction indicates that it corresponds to the movement of a scanning device. The y-direction stutter count provides the estimate of pixel stutter from pure statistical data variations. The pixels are measured by the scanner progressing in the x-direction and are possibly correlated to the previous pixel. The pixels in the y-direction are not correlated to the previous pixel. In some embodiments, it is not necessary to provide an estimate of statistical pixel stutter using statistical calculations because the y-direction stutter is a physical measurement of this variation.

In preferred embodiments, the methods include obtaining an image comprising a plurality of pixels using a scanner, obtaining a measurement of pixel stutter in the image, obtaining a statistical distribution of pixel stutter, and determining whether said measurement is above what is expected from said statistical distribution. As used herein, an image is a collection of data representing pixel values. An image may be in any suitable format, such as TIFF and BMP.

In some embodiments, the measurement of pixel stutter is time correlated. If the scanner obtains an image row by row, measurement of pixel stutter is row stuttered pixel count (or horizontal pixel count). In some embodiments, the statistical distribution of pixel stutter is a measurement of non-time correlated pixel stutter in an image and may be measured by column stuttered pixel count (or vertical stuttered pixel count).

The row stuttered pixel count and column stuttered pixel count can be compared to determine whether the image indicates pixel stutter of the scanner used to obtain it. This may involve a simple calculation of a ratio of horizontal count over vertical count. In some other embodiments, the comparison may be determined by examining statistical difference between said row and said column stuttered pixel counts.

In some preferred embodiments, graphic display of stuttered pixels overlaid on the image is provided.

In another aspect of the invention, computer software products for determining pixel stutter of a scanner are provided. The software products include computer code for obtaining an image comprising a plurality of pixels using a scanner; computer program code for obtaining a measurement of pixel stutter in the image; computer program code for obtaining a statistical distribution of pixel stutter; computer program code for determining whether the measurement is above what is expected from the statistical distribution; and a computer readable media for storing the codes.

In some embodiments, the measurement of pixel stutter is time correlated. The measurement of pixel stutter may be a row stuttered pixel count (or horizontal stuttered pixel count). The statistical distribution of pixel stutter can be a measurement of non-time correlated pixel stutter such as column stuttered pixel count (or vertical stuttered pixel count).

In some preferred embodiments, the computer program code for determining includes code for comparing row stuttered pixel count and column stuttered pixel count such as the code for comparing includes computer program code for calculating a ratio of horizontal stuttered pixel count over vertical stuttered pixel count or code for comparing comprises computer program code for determining whether there is a statistical difference between said row and said column stuttered pixel counts. The computer software may also include computer program code for displaying stuttered pixels overlaid on the image.

In yet another aspect, systems for detecting pixel stutter of a scanner are provided. The systems include a processor; and a memory being coupled to the processor, the memory storing a plurality of machine instructions that cause the processor to perform a plurality of logical steps when implemented by the processor, the logical steps including: obtaining an image comprising a plurality of pixels using the scanner; obtaining a measurement of pixel stutter in the image; obtaining a statistical distribution of pixel stutter; and determining whether the measurement is above what is expected from the statistical distribution. In some embodiments, the measurement of pixel stutter is time correlated. The measurement of pixel stutter may be a row stuttered pixel count (or horizontal stuttered pixel count). The statistical distribution of pixel stutter can be a measurement of non-time correlated pixel stutter such as column stuttered pixel count (or vertical stuttered pixel count).

In some preferred embodiments, the logic step of determining include comparing row stuttered pixel count and column stuttered pixel count, such as calculating a ratio of said two counts. In some other preferred embodiments, comparison is performed by determining whether there is a statistical difference between said row and said column stuttered pixel counts.

The logic steps may also include displaying stuttered pixels overlaid on the image.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENTS

Reference will now be made in detail to the preferred embodiments of the invention. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention. All patents and articles are hereby incorporated by reference in their entireties.

As will be appreciated by one of skill in the art, the present invention may be embodied as a method, data processing system or program products. Accordingly, the present invention may take the form of data analysis systems, methods, analysis software and etc. Software written according to the present invention is to be stored in some form of computer readable medium, such as memory, hard-drive, DVD ROM or CD ROM, or transmitted over a network, and executed by a processor. For a description of basic computer systems and computer networks, see, e.g., Introduction to Computing Systems: From Bits and Gates to C and Beyond by Yale N. Patt, Sanjay J. Patel, 1st edition (Jan. 15, 2000) McGraw Hill Text; ISBN: 0072376902; and Introduction to Client/Server Systems: A Practical Guide for Systems Professionals by Paul E. Renaud, 2nd edition (Jun. 1996), John Wiley & Sons; ISBN: 0471133337.

Computer software products may be written in any of various suitable programming languages, such as C, C++, Fortran and Java (Sun Microsystems). The computer software product may be an independent application with data input and data display modules. Alternatively, the computer software products may be classes that may be instantiated as distributed objects. The computer software products may also be component software such as Java Beans (Sun Microsystems), Enterprise Java Beans (EJB), Microsoft® COM/DCOM, etc.

Figure 1:
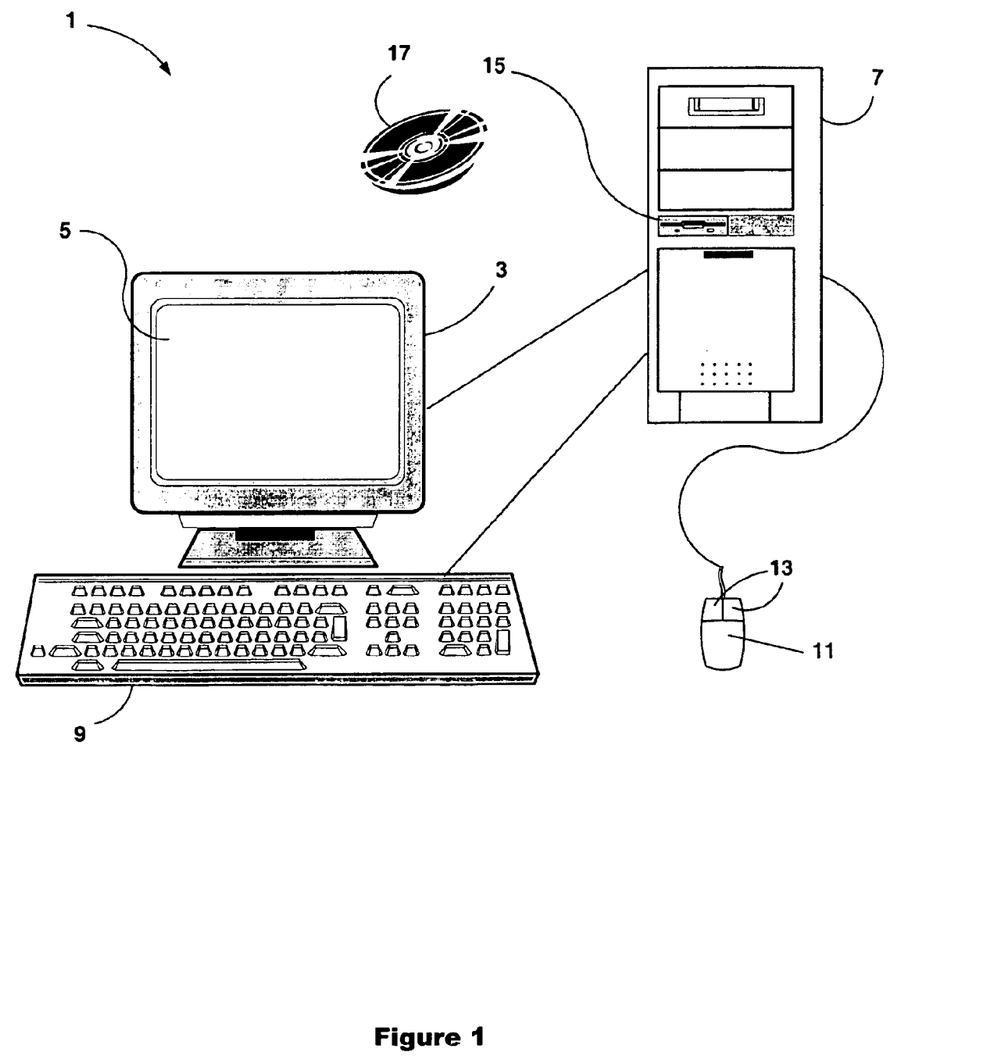
FIG. 1 illustrates an example of a computer system that may be utilized to execute the software of an embodiment of the invention.

FIG. 1 illustrates an example of a computer system that may be used to execute the software of an embodiment of the invention. FIG. 1 shows a computer system 1 that includes a display 3, screen 5, cabinet 7, keyboard 9, and mouse 11. Mouse 11 may have one or more buttons for interacting with a graphic user interface. Cabinet 7 preferably houses a CD-ROM or DVD-ROM drive 13, system memory and a hard drive (see, FIG. 2) which may be utilized to store and retrieve software programs incorporating computer program code that implements the invention, data for use with the invention and the like. Although a CD 15 is shown as an exemplary computer readable medium, other computer readable storage media including floppy disk, tape, flash memory, system memory, and hard drive may be utilized. Additionally, a data signal embodied in a carrier wave (e.g., in a network including the internet) may be the computer readable storage medium.

Computer systems are known in the art and are commercially available from sources such as IBM, New York, and Dell, Round Rock, Texas, etc.)

Figure 2:
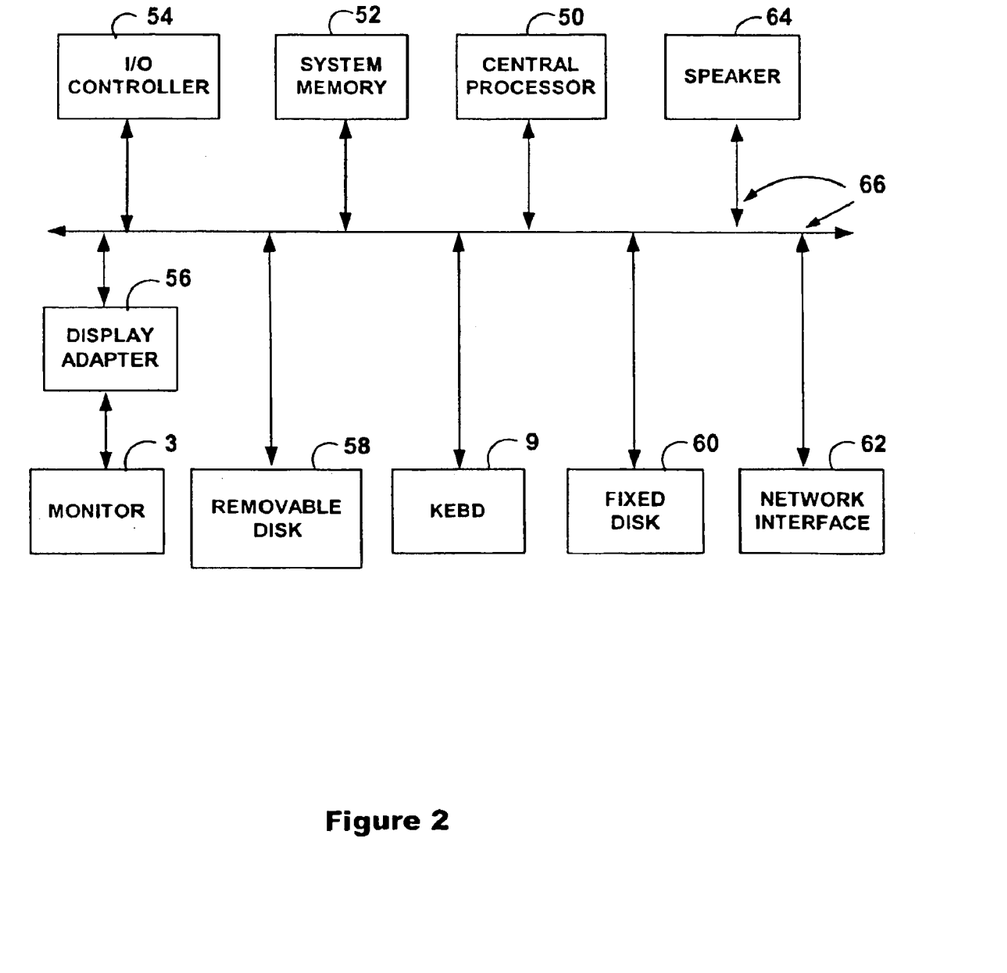
FIG. 2 illustrates a system block diagram of the computer system of FIG. 1.

FIG. 2 shows a system block diagram of computer system 1 used to execute the software of an embodiment of the invention. As in FIG. 1, computer system 1 includes monitor 3, and keyboard 9, and mouse 11. Computer system 1 further includes subsystems, such as a central processor 51, system memory 53, fixed storage 55 (e.g., hard drive), removable storage 57 (e.g., CD-ROM), display adapter 59, sound card 61, speakers 63, and network interface 65. Other computer systems suitable for use with the invention may include additional or fewer subsystems. For example, another computer system may include more than one processor 51 or a cache memory. Computer systems suitable for use with the invention may also be embedded in a measurement instrument or performed using ASIC devices or the like. The presently preferred method is designed at increasing the accuracy of data acquired from nucleic acid or other arrays. Arrays are typically two-dimensional substrates having biological compounds thereon. They are used for a variety of purposes, including detection of fluorescent compounds attached to the surface of the substrate. Particularly preferred arrays, uses of the arrays and devices to make, read, and interpret the data from arrays are shown in the following U.S. patents which are These arrays, also described as "microarrays" or colloquially "chips" have been generally described in the art, for example, U.S. Pat. Nos. 5,143,854, 5,445,934, 5,744,305, 5,677,195, 6,040,193, 5,424,186 and Fodor et al., Science, 251:767–777 (1991). Each of which is incorporated by reference in its entirety for all purposes.

These arrays may generally be produced using mechanical synthesis methods or light directed synthesis methods which incorporate a combination of photolithographic methods and solid phase synthesis methods. Techniques for the synthesis of these arrays using mechanical synthesis methods, such as ink jet, channel block, flow channel, and spotting methods which are described in, e.g., U.S. Pat. Nos. 5,384,261, and 6,040,193, which are incorporated herein by reference in their entirety for all purposes. Although a planar array surface is preferred, the array may be fabricated on a surface of virtually any shape or even a multiplicity of surfaces. Arrays may be peptides or nucleic acids on beads, gels, polymeric surfaces, fibers such as fiber optics, glass or any other appropriate substrate, see U.S. Pat. Nos. 5,744,305, 5,770,358, 5,789,162, 5,708,153, 6,040,193 and 5,800,992, which are hereby incorporated in their entirety for all purposes. Arrays may be packaged in such a manner as to allow for diagnostics or other manipulation of in an all inclusive device, see for example, U.S. Pat. Nos. 5,856,174 and 5,922,591, and 5,945,334, which are incorporated herein in their entireties by reference for all purposes. See also U.S. patent application Ser. No. 09/545,207 which is incorporated herein in its entirety for all purposes for additional information concerning arrays, their manufacture, and their characteristics. In acquiring data from the preferred embodiments shown above, it is important that the devices and software will acquire the data accurately.

The preferred methods, software products and systems of the present invention are particularly suitable for detecting what is termed "pixel stutter" of imaged which represent the hybridization patterns between the presently preferred nucleic acid probe arrays and their targets. In such preferred embodiments, "scanners" image the targets which are bound to an array by detecting fluorescent or other emissions on the target's labels, or by detecting transmitted, reflected, or scattered radiation. These processes are generally and collectively referred to hereafter for convenience simply as involving the detection of "emissions" and can include optical or other types of emission. Various detection schemes are employed depending on the type of emissions and other factors. A typical scheme employs optical or other elements to provide excitation light and to selectively collect the emissions. Also generally included are various light-detector systems employing photodiodes, charge-coupled devices (CCDs), photomultiplier tubes, and similar devices to register the collected emissions. For example, a scanning system for use with a fluorescent label is described in U.S. Pat. No. 5,143,854, incorporated by reference above. Other scanners or scanning systems are described in U.S. Pat. Nos. 5,578,832; 5,631,734; 5,834,758; 5,981,956 and 6,025,601, and in PCT Application PCT/US99/06097 (published as WO99/47964), each of which is hereby incorporated by reference in its entirety for all purposes. In the preferred embodiment of the invention, an array has many regions where a compound, such as a nucleic acid is located. Each region contains multiple pixels.

The scanning system provides data representing the intensities (and possibly other characteristics, such as color) of the detected emissions, as well as the locations on the substrate where the emissions were detected. The data typically are stored in a memory device in the form of a data file. One type of data file, commonly referred to as an "image file," typically includes intensity and location information corresponding to elemental sub-areas of the scanned substrate and appears as an "image" of the array. The term "elemental" in this context means that the intensities, and/or other characteristics, of the emissions from this area each are represented by a single value. When displayed as an image for viewing or processing, this information is often represented by elemental picture elements, or pixels. Thus, a pixel has a single value representing the intensity, or other characteristic, of the elemental sub-area of the substrate from which the emissions were scanned. Color can be used to represent a characteristic of a pixel. For example, a scanned elemental sub-area in which high-intensity emissions were detected may be represented by a pixel having high luminance (hereafter, a "bright" pixel), and low-intensity emissions may be represented by a pixel of low luminance (a "dim" pixel). Alternatively, the chromatic value of a pixel may be made to represent the intensity, color, or other characteristic of the detected emissions. Thus, an area of high-intensity emission may be displayed as a red pixel and an area of low-intensity emission as a blue pixel. As another example, detected emissions of one wavelength at a particular sub-area of the substrate may be represented as a red pixel, and emissions of a second wavelength detected at an adjacent sub-area may be represented by an adjacent blue pixel. Many other display schemes are known.

The methods, systems and software of the invention are also useful for detecting pixel stutter caused by scanner artifact. Scanner, as used herein, is intended to include devices that obtain picture elements in a sequential manner. For example, a scanner may obtain pixels in x or y directions of an image by moving a scanning head in a pixel by pixel fashion. However, scanners may also have mechanisms that obtain more than one pixel at a time.

Picture elements (pixels) are represented numerically as intensity values or coordinates in a color space. Once images are acquired in computer readable form, they may be "processed" to remove distortions, to reduce noise, to modify color, to accentuate outlines, and so forth. For a general tutorial overview of image processing, see, for example, Russ, John C., The Image Processing Handbook, 2nd Edition (1995), CRC Press, Inc. which is hereby incorporated by reference in its entirety.

In one aspect of the invention, computer implemented methods are provided to detect pixel stutter. "Pixel stutter" is two or more adjacent pixels that may have different intensity values, but they show the same intensity value because of scanning or other artifact(s). Among possible reasons for pixel stutter is uncleared memory buffer. For example, in one implementation of a laser scanner, optical signals are converted into digital signal via an analog digital converter. A memory buffer is used to hold acquired data. The temporary stored data are then read for further processing. In some instances, the buffer is not cleared and the same intensity value for a pixel may be read several times.

One of skill in the art would appreciate that pixel stutter can cause poor quality digital image and erroneous biological measurements. Therefore, methods for detecting pixel stutter are useful for detecting design or operational problems of scanners. In one application, the methods of the invention are used to monitor pixel stutter eradication by redesigning scanner electronics or software.

In one additional application, the methods of the invention is used to monitor the quality of images. Even a well designed scanner may occasionally produce an image with unaccepted pixel stutter. In preferred embodiments, the software of the invention for detecting pixel stutter may be a part of a scanner control software. Images obtained are analyzed according to the methods of the invention to detect scanning artifact related to pixel stutter. This is particularly useful for obtaining accurate images of biological arrays. In such application, the intensity value of each pixel provides valuable information about certain biological processes. If the scanning artifact is not detected early, the arrays may be discarded or otherwise not suitable for re-scanning after certain period of time. In some embodiments of the software products of the invention, a user is warned of potential unacceptable pixel stutter and the software accepts command to rescan to avoid the scanning artifact.

Pixels with the same intensity may occur because of spatial correlation or statistical distribution. In one aspect of the invention, the methods of the invention include steps to detect whether there is pixel stutter artifact by examining whether stuttered pixels (pixels with the same value) is above what's expected.

Figure 3:
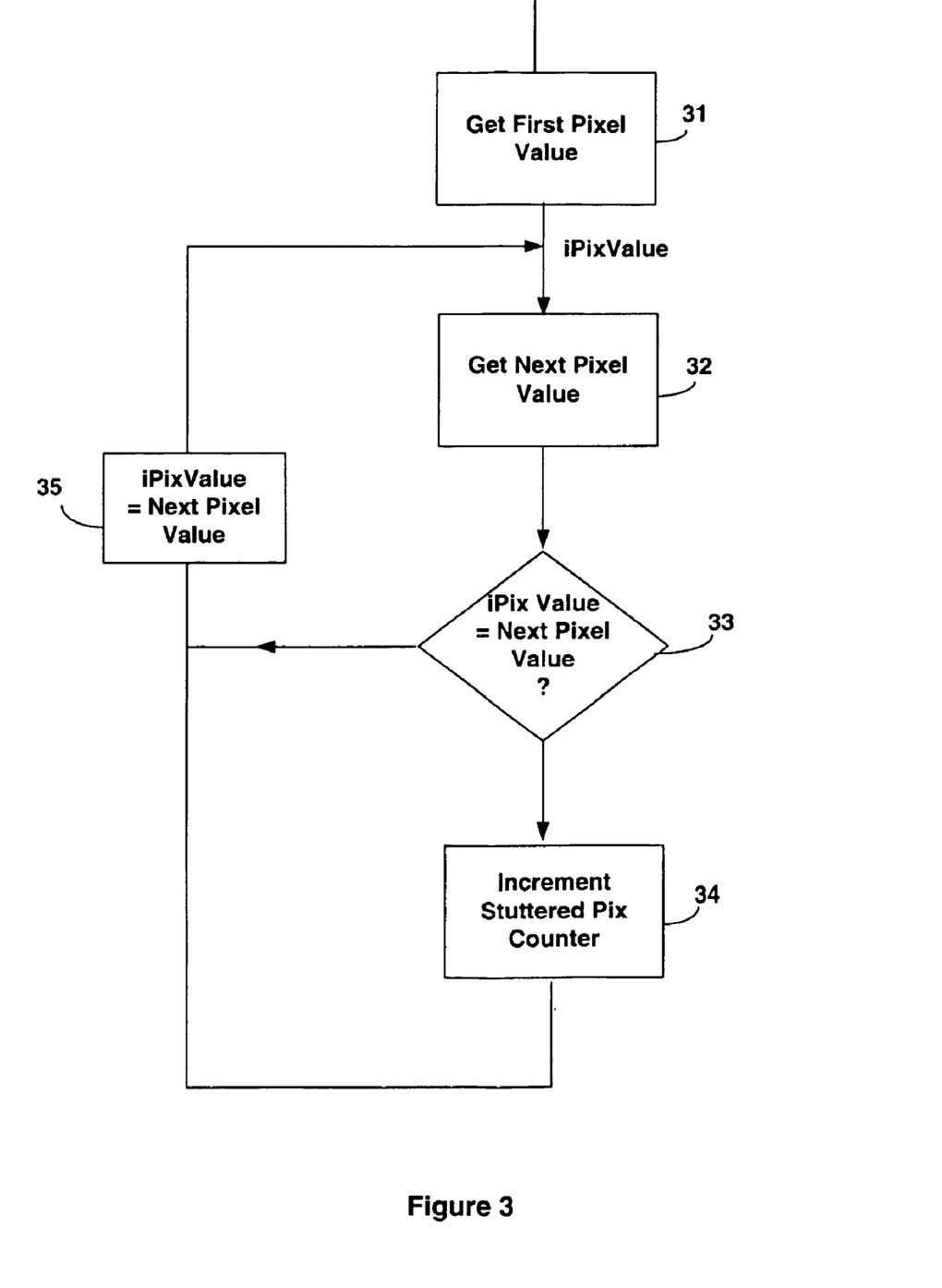
FIG. 3 shows a computer implemented process for counting stuttered pixels.

FIG. 3 shows a computer implemented process for detecting stuttered pixels in one dimension, such as a row or a column of an image. A computer program code is executed to input a first pixel value (31). The first pixel value is used as a reference (iPix Value=first pixel value). Next pixel value is then inputted (32) and compared with the iPix Value (33). If the next pixel value is equal to the iPix Value, a stuttered pixel counter is incremented (34). Otherwise, there is no increment in the stuttered pixel counter. One of skill in the art would appreciate that the stuttered pixel counter registers pixels that have the same values as their neighbors (in this specific embodiment, in one dimension along a row or a column), whether or not they are caused by scanner artifact.

In one aspect of the invention, a numeric count of stuttered pixels in both the x (row) and y (column) directions and a graphic display of the stuttered pixels overlaid on the image data are provided by the invention. One of skill in the art would appreciate that the designation of rows vs. columns and x vs. y direction are for the convenience of describing embodiments of the invention. In general, the designation of row or x direction indicates that it corresponds to the movement of a scanning device. The y-direction stutter count provides the estimate of pixel stutter from pure statistical data variations. The pixels are measured by the scanner progressing in the x-direction and are possibly correlated to the previous pixel. The pixels in the y-direction are not correlated to the previous pixel.

Figure 4:
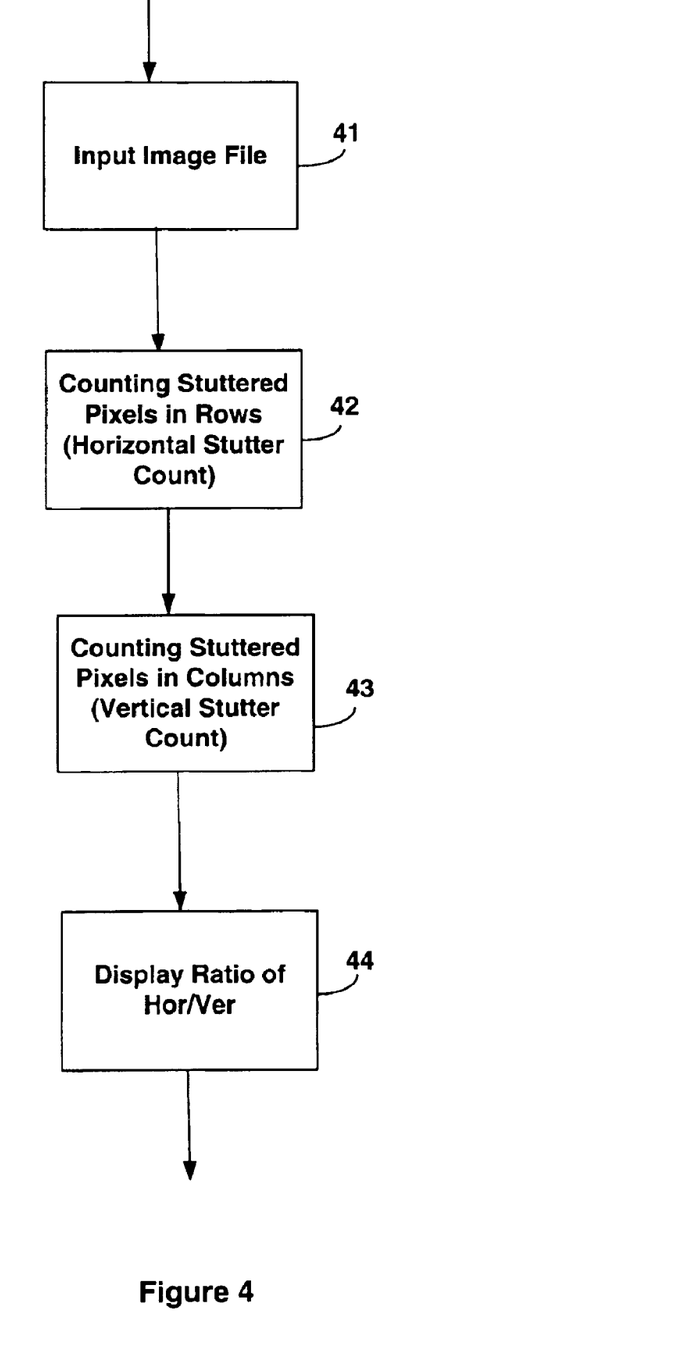
FIG. 4 shows a computer implemented process for detecting pixel stutter of a scanner.

FIG. 4 shows one embodiment of the computer implemented process of the invention. An image file is inputted (41). Stuttered pixels along the rows of pixels in the image (horizontal stutter count) is counted. Thereafter, stuttered pixels in columns (43) is counted (vertical stutter count). A ratio of horizontal stutter count over vertical stutter count is displayed (44).

In preferred embodiments, the methods include obtaining an image comprising a plurality of pixels using a scanner, obtaining a measurement of pixel stutter in the image, obtaining a statistical distribution of pixel stutter, and determining whether said measurement is above what is expected from said statistical distribution.

In some embodiments, the measurement of pixel stutter is time correlated. If the scanner obtains an image row by row, measurement of pixel stutter is row stuttered pixel count (or horizontal pixel count). In some embodiments, the statistical distribution of pixel stutter is a measurement of non-time correlated pixel stutter in an image and may be measured by column stuttered pixel count (or vertical stuttered pixel count).

The row stuttered pixel count and column stuttered pixel count can be compared to determine whether the image indicates pixel stutter of the scanner used to obtain it. This may involve a simple calculation of a ratio of horizontal count over vertical count. In some other embodiments, the comparison may be determined by examining statistical difference between said row and said column stuttered pixel counts.

In some preferred embodiments, graphic display of stuttered pixels overlaid on the image is provided.

In another aspect of the invention, computer software products for determining pixel stutter of a scanner are provided. The software products include computer code for obtaining an image comprising a plurality of pixels using a scanner; computer program code for obtaining a measurement of pixel stutter in the image; computer program code for obtaining a statistical distribution of pixel stutter; computer program code for determining whether the measurement is above what is expected from the statistical distribution; and a computer readable media for storing the codes.

In some embodiments, the measurement of pixel stutter is time correlated. The measurement of pixel stutter may be a row stuttered pixel count (or horizontal stuttered pixel count). The statistical distribution of pixel stutter can be a measurement of non-time correlated pixel stutter such as column stuttered pixel count (or vertical stuttered pixel count).

In some preferred embodiments, the computer program code for determining includes code for comparing row stuttered pixel count and column stuttered pixel count such as the code for comparing includes computer program code for calculating a ratio of horizontal stuttered pixel count over vertical stuttered pixel count or code for comparing comprises computer program code for determining whether there is a statistical difference between said row and said column stuttered pixel counts. The computer software may also include computer program code for displaying stuttered pixels overlaid on the image.

In yet another aspect, systems for detecting pixel stutter of a scanner are provided. The systems include a processor; and a memory being coupled to the processor, the memory storing a plurality of machine instructions that cause the processor to perform a plurality of logical steps when implemented by the processor, the logical steps including: obtaining an image comprising a plurality of pixels using the scanner; obtaining a measurement of pixel stutter in the image; obtaining a statistical distribution of pixel stutter; and determining whether the measurement is above what is expected from the statistical distribution. In some embodiments, the measurement of pixel stutter is time correlated. The measurement of pixel stutter may be a row stuttered pixel count (or horizontal stuttered pixel count). The statistical distribution of pixel stutter can be a measurement of non-time correlated pixel stutter such as column stuttered pixel count (or vertical stuttered pixel count).

In some preferred embodiments, the logic step of determining includes comparing row stuttered pixel count and column stuttered pixel count, such as calculating a ratio of said two counts. In some other preferred embodiments, comparison is performed by determining whether there is a statistical difference between said row and said column stuttered pixel counts.

The logic steps may also include displaying stuttered pixels overlaid on the image.

Appendix A is a computer program named "DAT TOOL". This program was used to analyze image data sets from two scanners, one that exhibited pixel stutter (Scanner H) and one that did not (Scanner G). Table 1 shows the result of stutter counts.

TABLE 1

Stuttered Pixel Counts

| Scanner | Data | Vertical Stutter Count | Horizontal Stutter Count | Ratio Hor/Ver |
|---|---|---|---|---|
| H | Image H1 | 5183 | 5016 | .96 |
| G | Image G2 | 430 | 18241 | 42.4 |
| G | Image G3 | 325 | 18300 | 56.3 |
| G | Image G4 | 323 | 17491 | 54.2 |

The Ratio column in the table indicates, for example, that Images G2, G3, and G4 have about 42, 56, 54 times, respectively, more pixel stutter than would be expected from purely statistical sources. The results indicate that Scanner H does not have detectable stutter artifact; while Scanner G suffers from stutter artifact.

Figure 5:
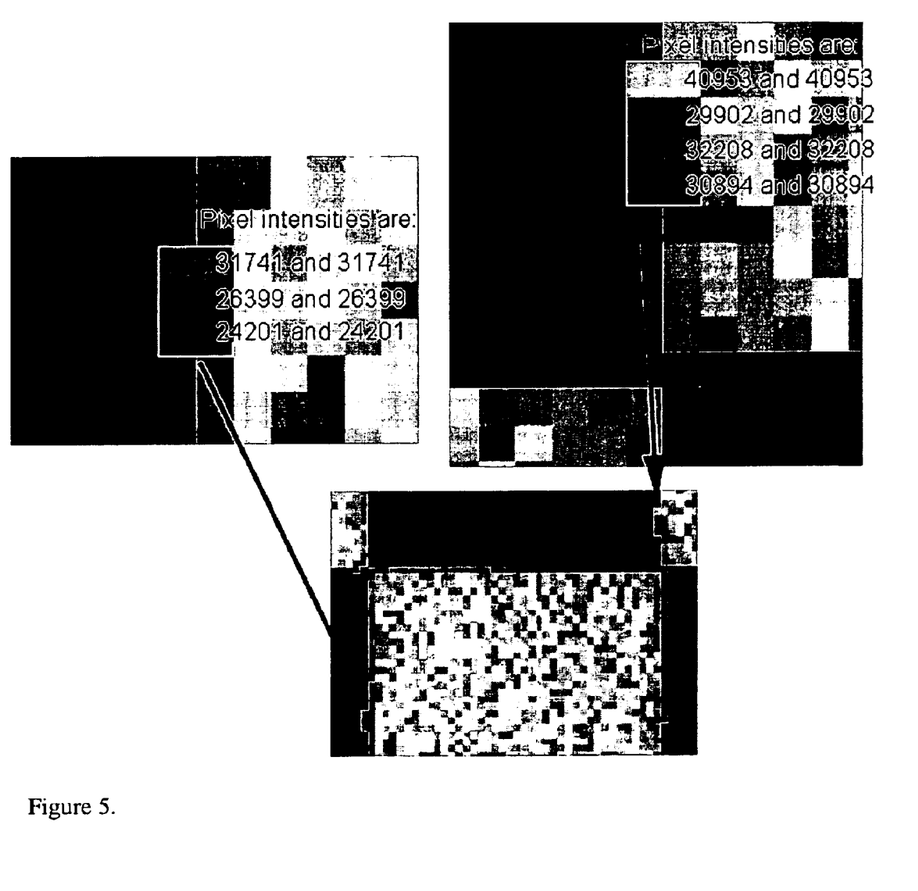
FIG. 5 shows stuttered pixels.

As mentioned above, a preferred embodiment of the invention relates to arrays of biopolymers, called arrays. See U.S. Pat. No. 5,445,934 and the other patents referred to above. Arrays have areas or regions that are designed to have one biopolymer, such as a nucleic acid. There are many pixels in each region or area typically. For example, see FIG. 5 in which the lower image shows a light rectangular area (a region) formed by dark areas (other regions) with smaller squares therein (pixels).

The above description is illustrative and not restrictive. Many variations of the invention will become apparent to those of skill in the art upon review of this disclosure. Merely by way of example, while the invention is illustrated with particular reference to the evaluation of scanner used for scanning nucleic acid arrays, the methods, software and systems can be used in the evaluation and design of other scanners such as those used for scanning color pictures, etc. The scope of the invention should, therefore, be determined not with reference to the above description, but instead should be determined with reference to the appended claims along with their full scope of equivalents.

All references including patent and non-patent literature cited herewith are incorporated herein by reference in their entireties for all purposes.

APPENDIX A

Inventors: Dan Bartell
Richard Watts
Attorney Docket Number: 3272
Title: Methods, Systems and Software for Pixel Stutter Detection

```
/////////////////////////////////////////////////////////////////////////////////
void CDatToolDlg::TagStutter( )
{
    //Create output dat file
    ImageData * pOutputImg;
    pOutputImg = new ImageData;
    pOutputImg->SetName(this->m_OutputFile);
    pOutputImg->Create(m_pInputImage->xSize( ),m_pInputImage->ySize( ));
    pOutputImg->SetSize(m_pInputImage->xSize( ),m_pInputImage->ySize( ));
    //Copy input dat file to output dat file
    this->CopyImage(pOutputImg,m_pInputImage);
    //A few local variables
    unsigned short * inputDataPointer=m_pInputImage->GetDataPtr( );
    unsigned short * outputDataPointer=pOutputImg->GetDataPtr( );
    int numCols=m_pInputImage->xSize( );
    int nStutter=0, iRowStart, iRowEnd, iColStart, iColEnd;
    if (m_StutterArea == ENTIRE_IMAGE)
    {
        iRowStart=0;
        iRowEnd=m_pInputImage->ySize( ) -1;
        iColStart=0;
        iColEnd=m_pInputImage->xSize( ) -1;
    }
    else
    {
        //Does the input image have a valid grid?
        if ( (m_pInputImage->CellGrid.lowerleft.y > 0) && (m_pInputImage->CellGrid.lowerleft.x > 0))
        {
            //yes, valid grid
            iRowStart=_max(m_pInputImage->CellGrid.upperleft.y,m_pInputImage->CellGrid.upperright.y);
            iRowEnd= _min(m_pInputImage->CellGrid.lowerleft.y,m_pInputImage->CellGrid.lowerright.y);
            iColStart=_max(m_pInputImage->CellGrid.upperleft.x,m_pInputImage->CellGrid.lowerleft.x);
            iColEnd=_min(m_pInputImage->CellGrid.upperright.x,m_pInputImage->CellGrid.lowerright.x);
        }
        else
        {
            //no, invalid grid
            AfxMessageBox("Operation Canceled due to invalid grid");
            //Dispose memory
            delete pOutputImg;
            pOutputImg=NULL;
            return;
        }
```

APPENDIX A-continued

```
        }
    if (m_StutterDirection==HORIZONTAL_STUTTER)
    {
        //For all the image pixels
        for (int iRow=iRowStart;iRow <=iRowEnd;iRow++)
    {
            //Get A row of the input image
            int iRowOffset=iRow * numCols;
            //Get the first pixel value in the row
            inputDataPointer=m_pInputImage->GetDataPtr();
            unsigned short iPixValue=inputDataPointer[iRowOffset+iColStart];
            //Walk across the row
            for ( int iCol=iColStart+1;iCol <= iColEnd;iCol++)
            {
                //If the pixel is identical to the next pixel, then set both pixels to the
stutter replacement value
                if (inputDataPointer[iRowOffset + iCol] == iPixValue)
                {
                    nStutter++;
                    outputDataPointer[iRowOffset + iCol] = m_StutterReplace;
                    outputDataPointer[iRowOffset + iCol-1] = m_StutterReplace;
                }
                else
                {
                    //do nothing
                }
                //move on
                iPixValue=inputDataPointer[iRowOffset+iCol];
            }
        }
    }
    else
    {
        //Vertical stutter
        //For all the image pixels
        for (int iCol=iColStart;iCol<=iColEnd;iCol++)
        {
            //For each column, walk the row
            int iOffsetPrev=iRowStart*numCols + iCol;
            unsigned short iPixValuePrev = inputDataPointer[OffsetPrev];
            //Walk down the column
            for (int iRow=iRowStart+1; iRow <= iRowEnd; iRow++)
            {
                int iOffset=iRow*numCols + iCol;
                unsigned short iPixValue=inputDataPointer[iOffset];
                //If the pixel is identical to the previous pixel value, then set both pixels to
the stutter replacement value
                if (iPixValue == iPixValuePrev)
                {
                    nStutter++;
                    outputDataPointer[iOffsetPrev]=m_StutterReplace;
                    outputDataPointer[iOffset]=m_StutterReplace;
                }
                else
                {
                    //do nothing
                }
                //move on
                iOffsetPrev=iOffset;
                iPixValuePrev=iPixValue;
            }
        }
    }
    //Write the dat file.
    if (!pOutputImg->Write( ))
    {
        AfxMessageBox(IDS_ERRORWRITE);
    }
long lSize=m_pInputImage->xSize( ) *m_pInputImage->ySize();
    long replacedPixels=2*nStutter;
    float stutterRatio=(float(nStutter))/float(lSize)
    //Report
    CString outString1,outString2;
    outString1.Format("Stutter Report for %s\nOutput Image: %s\n",m_pInputImage->GetName(),pOutputImg->GetName());
    if (m_StutterArea==ENTIRE_IMAGE)
    {
        outString2="Area Analyzed is Entire Image\n";
    }
```

APPENDIX A-continued

```
    else
    {
        outString2.Format("Area Analyzed is Rows: %d to %d and   Cols: %d to
%d\n",iRowStart,iRowEnd,iColStart,iColEnd);
    }
    outString1 += outString2;
    if (m_StutterDirection == HORIZONTAL_STUTTER)
    {
        outString2="Direction is Horizontal\n";
    }
    else
    {
        outString2="Direction is Vertical\n";
    }
    outString1 += outString2;
    outString2.Format("Total Pixels:\t%d\nReplaced Pixels:\t%d\nStutter Count:\t%d\nStutterRatio:\t%10.6f,
%e",
        lSize,replacedPixels,nStutter,stutterRatio,stutterRatio);
    outString1 += outString2;
    AfxMessageBox(outString1);
    //Dispose memory
    delete pOutputImg;
    pOutputImg=NULL;
}
```

What is claimed:

1. A computer implemented method for detecting pixel stutter, wherein the pixel stutter is when two or more adjacent pixels with the same intensity value, of a scanner comprising:
   obtaining an image representing a plurality of pixels using said scanner; wherein said image has a plurality of rows and columns of pixels, wherein said scanner obtains said image row by row;
   obtaining a measurement of pixels stutter said image, wherein said measurement of pixel stutter is time correlated; wherein said measurement of pixel stutter is row stuttered pixel count;
   obtaining a statistical distribution of pixel stutter; wherein said statistical distribution of pixel stutter is a measurement of non-time correlated pixel stutter in said image; and wherein said statistical distribution is measured by column stuttered pixel count; and;
   determining whether said measurement is above what is expected from said statistical distribution; wherein said determining comprises comparing row stuttered pixel count and column stuttered pixel count; wherein said comparing comprises calculating a ratio of said row and column stuttered pixel counts.

2. A computer software product for detecting pixel stutter, wherein the pixel stutter is when two or more adjacent pixels with the same intensity value, of a scanner comprising:
   computer program code for obtaining an image representing a plurality of pixels using said scanner; wherein said image has a plurality of rows and columns of pixels wherein said scanner obtains said image row by row;
   computer program code for obtaining a measurement of pixel stutter in said image; wherein said measurement of pixel stutter is time correlated; and wherein said measurement of pixel stutter is row stuttered pixel count:
   computer program code for obtaining a statistical distribution of pixel stutter; wherein said statistical distribution of pixel stutter is a measurement of non-time correlated pixel stutter in said image and wherein said statistical distribution is measured by column stuttered pixel count;
   computer program code for determining whether said measurement is above what is expected from said statistical distribution; wherein said determining comprises computer program code for comparing row stuttered pixel count and column stuttered pixel count; wherein said code for comparing comprises computer program code for calculating a ratio of said row and column stuttered pixel counts;
   a computer readable media for storing said codes.

3. A system for detecting pixel stutter, wherein the pixel stutter is when two or more adjacent pixels with the same intensity value, of a scanner comprising:
   a processor; and
   a memory coupled to the processor, the memory capable of storing a plurality machine instructions that cause the processor to perform a plurality of logical steps when implemented by the processor, said logical steps including:
      obtaining an image representing a plurality of pixels using said scanner; wherein said image has a plurality of rows and columns of pixels; wherein said scanner obtains said image row by row and;
      obtaining a measurement of pixel stutter in said image; wherein said measurement of pixel stutter is time correlated; and wherein said measurement of pixel stutter is row stuttered pixel count;
      obtaining a statistical distribution of pixel stutter wherein said statistical distribution of pixel stutter is a measurement of non-time correlated pixel stutter in said image, and wherein said statistical distribution is measured by column stuttered pixel count; and
      determining whether said measurement is above what is expected from said statistical distribution; wherein said determining comprises comparing row stuttered pixel count and column stuttered pixel count; wherein said comparing comprises calculating a ratio of said row and column stuttered pixel counts.

4. The system of claim 3 wherein said comparing comprises determining whether there is a statistical difference between said row and said column stuttered pixel counts.

5. The system of claim 4 wherein said logic step further comprises displaying stuttered pixels overlaid on said image.

* * * * *